United States Patent
Kanayama (10) Patent No.: US 10,369,895 B2
(45) Date of Patent: Aug. 6, 2019

(54) POWER SUPPLY CONTROLLER

(71) Applicant: DENSO CORPORATION, Kariya, Aichi-pref. (JP)

(72) Inventor: Mitsuhiro Kanayama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 505 days.

(21) Appl. No.: 15/166,454

(22) Filed: May 27, 2016

(65) Prior Publication Data

US 2016/0347194 A1  Dec. 1, 2016

(30) Foreign Application Priority Data

May 29, 2015  (JP) .................. 2015-109800

(51) Int. Cl.
*B60L 11/18* (2006.01)
*H02J 3/00* (2006.01)
(Continued)

(52) U.S. Cl.
CPC ........... *B60L 11/1842* (2013.01); *B60L 53/64* (2019.02); *B60L 55/00* (2019.02); *H02J 7/045* (2013.01); *H02J 13/0006* (2013.01); *H02J 2007/0096* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
None
See application file for complete search history.

(56) References Cited

U.S. PATENT DOCUMENTS

2011/0032075 A1* 2/2011 Alrabady ............... H04L 12/12
340/5.72
2012/0078432 A1* 3/2012 Weatherhead ......... G06Q 10/06
700/295
(Continued)

FOREIGN PATENT DOCUMENTS

DE  102009027387 A1  1/2011
DE  102010006527 A1  8/2011
(Continued)

*Primary Examiner* — Jared Fureman
*Assistant Examiner* — Joel Barnett
(74) *Attorney, Agent, or Firm* — Harness, Dickey & Pierce, P.L.C.

(57) ABSTRACT

A charger of a vehicle serving as a power supply controller includes, a power amount controller performing, (a) when a determiner determines that a high level device is available, a first control that determines a supply power amount to a storage battery according to an instruction value from the high level device, and, (b) when the determiner determines that the high level device is not available, a second control that determines the supply power amount according to information about a past power supply from an in-house power system (i.e., a power restriction value of the in-house power system), for an uninterrupted power supply between an outside-of-vehicle power system and the charger in the vehicle.

15 Claims, 6 Drawing Sheets

(51) Int. Cl.
   *H02J 7/04*      (2006.01)
   *H02J 13/00*     (2006.01)
   *B60L 53/64*     (2019.01)
   *B60L 55/00*     (2019.01)
   *H02J 7/00*      (2006.01)

(56) References Cited

U.S. PATENT DOCUMENTS

| | | | |
|---|---|---|---|
| 2012/0086397 A1* | 4/2012 | Obayashi | H02J 3/32 |
| | | | 320/109 |
| 2012/0112696 A1 | 5/2012 | Ikeda et al. | |
| 2012/0134062 A1 | 5/2012 | Wortberg | |
| 2012/0271471 A1 | 10/2012 | Lee et al. | |
| 2014/0266039 A1 | 9/2014 | Dougherty | |
| 2014/0336965 A1* | 11/2014 | Mori | H01M 10/46 |
| | | | 702/63 |
| 2015/0077054 A1* | 3/2015 | Uyeki | H02J 7/0052 |
| | | | 320/109 |
| 2016/0107534 A1 | 4/2016 | Ikeda et al. | |

FOREIGN PATENT DOCUMENTS

| | | |
|---|---|---|
| JP | 2010-166768 A | 7/2010 |
| JP | 2012085372 A | 4/2012 |
| JP | 2014200171 A | 10/2014 |

\* cited by examiner

POWER SUPPLY CONTROLLER

CROSS REFERENCE TO RELATED APPLICATION

The present application is based on and claims the benefit of priority of Japanese Patent Application No. 2015-109800, filed on May 29, 2015, the disclosure of which is incorporated herein by reference.

TECHNICAL FIELD

The present disclosure generally relates to a power supply controller that controls a power supply between a power storage device in a vehicle and an outside-of-vehicle power system.

BACKGROUND INFORMATION

Currently, the electric vehicles (EV) and the plug-in hybrid vehicles (PHEV) are widely marketed as vehicles, which are navigable by electric power and are chargeable directly by the electric power from an outside-of-vehicle power system (i.e., directly by the electric power from a power outlet in a house). In those vehicles, an amount of charge/storage of the electric power to a storage battery in the vehicle is ever increasing due to a higher storage capacity of the storage battery, thereby a decrease of the charge time for charging the storage battery is an important issue. For a quick charge of the storage battery by the electric power from the outside-of-vehicle power system in response to a request from the vehicle, it is desirable to maximize the amount of supply of the electric power from the outside-of-vehicle power system, or a supply power amount, closer to the limit capacity of a breaker of the outside-of-vehicle power system, for quickly/speedily filling/charging the storage battery. In terms of such power supply technique, a patent document, Japanese Patent Laid-Open No. 2010-166768 (patent document 1) proposes, for example, a variable charge amount control/adjustment technique that adjusts a charge amount for a secure charging operation (i.e., for avoiding a breaker operation), when a breaker operation of interrupting a supply of the electric power is predicted.

For example, when a Home Energy Management System (HEMS) or the like is used as a high level device (i.e., a management device) for an energy management of an in-house power system that is installed in a house or the like, such a high level device is typically used for the charge amount control/adjustment of a charger disclosed in the patent document 1. In such control/adjustment, the charger exchanges information about the supply of the electric power with the vehicle, and the information from the vehicle is transmitted to the high level device. The high level device then calculates an instruction value of the charge amount for controlling the charger, based on an adjustment on how to distribute the electric power among each of the loads (i.e., electric appliances) in the in-house power system, so that the breaker of the in-house power system is not going to the operate (i.e., is not going to interrupt the supply of the electric power from the vehicle during the charge of the vehicle battery). The charger then charges the storage battery in the vehicle according to the instruction value from the high level device.

However, the high level device, such as HEMS or the like, may be implemented in various forms (i.e., either as an in-house installed type or a portable type). That is, the high level device may be a personal computer or a smart phone, which may not output an instruction on regular basis. Further, in case of device failure of the high level device, for example, the charger may have to operate independently (i.e., without receiving an instruction from the high level device). Even in such a situation, the power supply between the power storage device in the vehicle and the outside-of-vehicle power system is preferably performed without interruption (i.e., without causing an operation of the breaker to interrupt the power supply between the power storage device and the outside-of-vehicle power system.

SUMMARY

It is an object of the present disclosure to provide a power supply controller that is capable of performing a secure power supply between the power storage device in the vehicle and the outside-of-vehicle power system without causing an operation of the breaker of the outside-of-vehicle power system.

In an aspect of the present disclosure, a power supply controller connected with a power storage device disposed in a vehicle, and with an outside-of-vehicle power system disposed outside of the vehicle. The outside-of-vehicle power system has a breaker that (a) supplies an electric power from a commercial power system to an internal load of the outside-of-vehicle power system and (b) interrupts a power supply from the commercial power system to the internal load when the system is in operation, for performing at least one of a charge control that charges the electric power supplied from the outside-of-vehicle power system to the power storage device and a discharge control that discharges the electric power supplied from the power storage device to the outside-of-vehicle power system.

The power supply controller includes a power amount controller controlling a supply power amount of the charge control or the discharge control, and a determiner determining whether a management device is available to control a power supply to the internal load of the outside-of-vehicle power system.

The power amount controller performs a first control that determines the supply power amount according to an instruction value from the management device, when the determiner determines that the management device is available/exists. Also, the power amount control performs a second control that determines the supply power amount according to information about a past power supply from the outside-of-vehicle power system, i.e., a history of an actual power supply from the outside-of-vehicle power system in the past, when the determiner determines that the management device is unavailable.

In such configuration, even when the communication between the power supply controller and the management device of the outside-of-vehicle power system is disabled (i.e., when the power supply controller and the management device are non-communicable with each other), the power supply controller is capable of independently setting the supply power amount for the charge control or for the discharge control, i.e., without relying on the management device, thereby appropriately enabling the setting of the supply power amount, regardless of the communication therebetween. As a result, the charge control or the discharge control is performable between the power storage device in the vehicle and the outside-of-vehicle power system without causing an operation of the breaker of the outside-of-vehicle power system, for securely receiving a power supply from the outside-of-vehicle power system to the vehicle.

According to the present disclosure, when the supply of the electric power is performed from one to the other between the electric power storage device in the vehicle and the outside-of-vehicle power system, such a supply of the electric power is securely performable without causing the operation of the breaker in the outside-of-vehicle power system, i.e., without an interruption of a supply of the electric power from a supply side.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiments of the present disclosure are described, with reference to the accompanying drawings. For the ease of understanding and the brevity of the description, the same numerals are assigned to the same/like components in each of those embodiments and the drawings.

First Embodiment

The first embodiment of the present disclosure is described with reference to FIGS. 1 and 2. The first embodiment describes a charger 4 as an example of a power supply controller concerning the present disclosure.

A power supply system 1 to which the charger 4 (i.e., a power supply controller) concerning the first embodiment of the present disclosure is applied is described with reference to FIG. 1.

Figure 1:
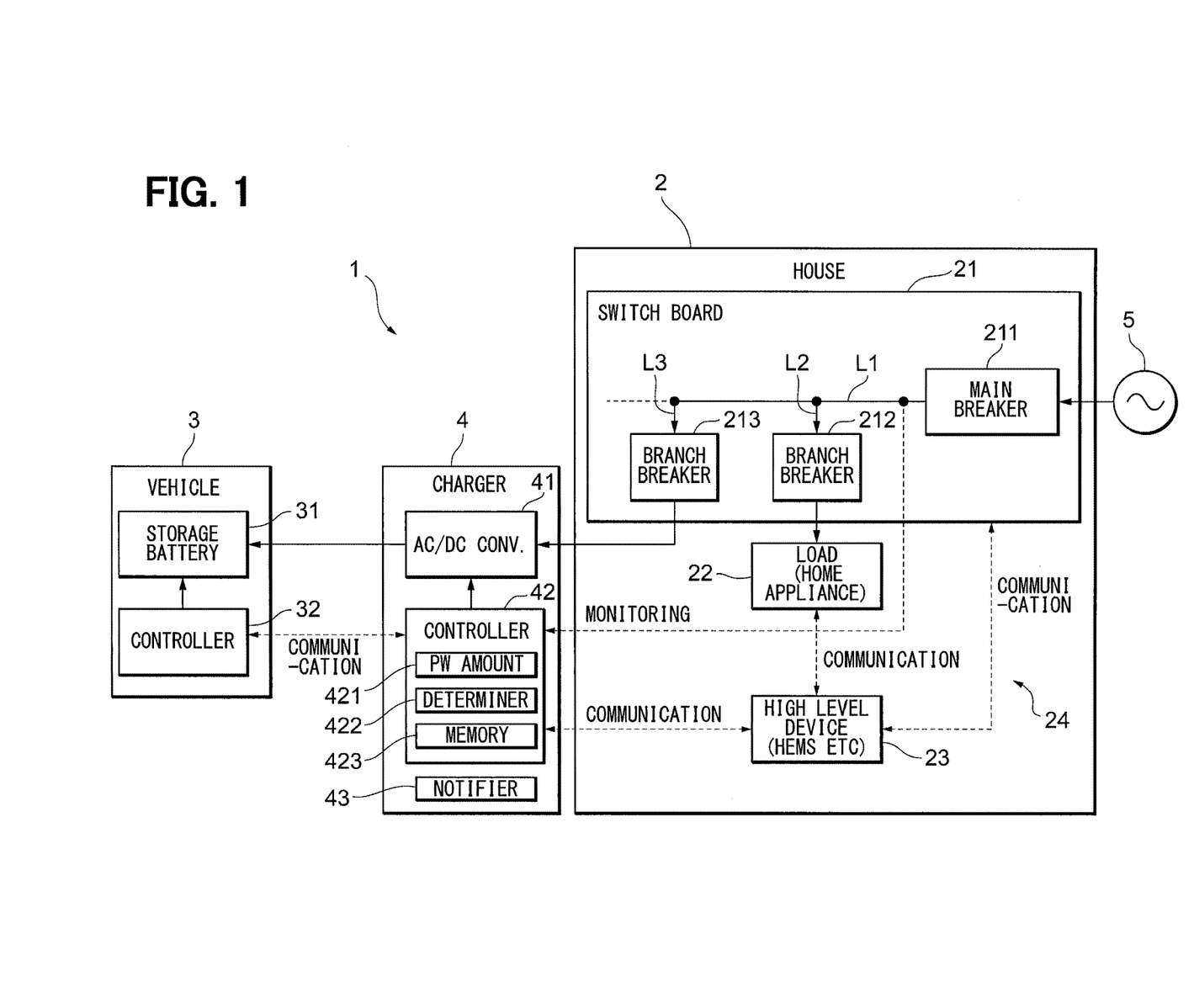
FIG. 1 is a block diagram of a power supply system that is applied to a charger (i.e., a power supply controller) concerning a first embodiment of the present disclosure.

The power supply system 1 of the first embodiment is used for charging a storage battery 31 (i.e., a power storage device) in a vehicle 3 directly from a power grid (i.e., from an outside-of-vehicle power system outside of the vehicle 3, for example, by receiving an electric power from the power supply outlet of an ordinary house), as shown in FIG. 1. In the present embodiment, an in-house power system 24 installed in a house 2 that is an ordinary house is described as an example of the outside-of-vehicle power system.

The power supply system 1 includes the vehicle 3, the in-house power system 24 of the house 2, and the charger 4.

The vehicle 3 is an electric vehicle (EV) or a plug-in hybrid vehicle (PHEV) that is equipped with (i) a rotating electric machine as its power source for a travel (not illustrated) and (ii) the storage battery 31 that is directly chargeable by an outside power source (i.e., a power source outside of the vehicle 3).

The storage battery 31 is a chargeable and dischargeable direct-current power supply (i.e., DC power), for example, and comprises rechargeable batteries (e.g., a nickel hydride battery and a lithium ion battery).

The storage battery 31 is configured as chargeable by the electric power generated by the rotating electric machine, or by the electric power supplied from outside of the vehicle 3. The storage battery 31 is configured as dischargeable (i.e., to discharge the electric power stored therein to supply the electric power to the rotating electric machine).

The charge control and the discharge control of the storage battery 31 are controlled by a controller 32 disposed in the vehicle 3.

The in-house power system 24 installed in the house 2 is a system of supplying the electric power from the commercial power system 5 to each of electric loads 22 in the house 2 (i.e., to each of the home appliances or the like), via a switch board 21, which supplies an alternate-current electric power (i.e., AC power) from the system 5 to the loads 22.

According to the present embodiment, the in-house power system 24 is also connected with the charger 4 through the switch board 21, for the supply of the alternate electric current from the system 5 to the charger 4.

The loads 22 and the charger 4 respectively receive a supply of the electric power from the in-house power system 24, via a connection of a plug of each of the loads 22 to the wiring (e.g., to the outlet in the house 2), or via a direct connection with such wiring.

The switch board 21 has a main breaker 211 and branch breakers 212, 213. The main breaker 211 is disposed in the middle of a power line L1 that is drawn into the switch board 21 from the commercial power system 5.

When an unusual excessive current flows into the power line L1 by the short circuit etc., the main breaker 211 interrupts the electric power supply from the commercial power system 5 by breaking a circuit connection, i.e., by turning into an interrupted state, thereby preventing a damage either to the power line L1 or to the home appliances.

The branch breakers 212, 213 are disposed in the middle of wires L2, L3 that are branched from the power line L1, respectively. According to the present embodiment, the loads 22 in the house 2 are connected with the wire L2, and an AC/DC converter 41 of the charger 4 is connected with the wire L3.

The branch breakers 212, 213 protect the wire L2, the loads 22, the wire L3, and the charger 4 from damage by turning into the interrupted state, when the unusual excessive current flows into the wire L2 and L3 due to an electrical overload, a short circuit, etc.

In the present embodiment, "causing the operation of the breaker of the in-house power system 24" means that at least one of the breakers 211, 212, 213 is put in the interrupted state by the flow of the excessive electric current, i.e., by a flow of the electric current exceeding a capacity of the breaker 211, 212 or 213.

Further, "the breaker interrupting the power supply from the commercial power system 5 to the loads 22 when the breaker operates" refers either to the main breaker 211 or to the branch breaker 212.

The in-house power system 24 is provided with a high level device 23 (i.e., a management device), e.g., a Home Energy Management System (HEMS), for example. The high level device 23 is a device that manages the power distribution to each of the loads 22 in the in-house power system 24.

The high level device 23 is configured to be communicable with the switch board 21 and the loads 22 in the in-house power system 24, and also communicable with a controller 42 of the charger 4 mentioned later, via a wired channel or via a wireless channel.

The high level device 23 monitors the supply power amount to the entire in-house power system 24, and/or monitors the supply power amount to each of the loads 22 and to the charger 4, and controls the power distribution to each of the loads 22 and to the charger 4 so that the electric power does not exceeds a predetermined breaker capacity. In other words, the high level device 23 may be defined as a device in a high level relative to each of the loads 22 and the charger 4 in the in-house power system 24, i.e., relative to low level devices.

The high level device 23 calculates the supply power amount to be supplied to the charger 4 for controlling the power amount of the in-house power system 24 to the maximum value within the breaker capacity, and outputs an instruction value of the charge amount to the charger 4.

For example, when there is little power demand from each of the loads 22 in the in-house power system 24, the power supply for the charger 4 may be increased within the breaker capacity by appropriately setting the instruction value, and when there is much more greater power demand from each of the loads 22 of the in-house power system 24, the power supply for the charger 4 may be decreased for controlling the supply power amount to be within the breaker capacity, or the power supply to the charger 4 may be stopped (i.e., charging may be stopped) by appropriately setting the instruction value.

The high level device 23 may be configured as a stationary type device fixedly installed on a wall inside of the house 2, or may be configured as a portable device that is freely carried around by the user. The switch board 21, the loads 22, and the high level device 23 constitute the in-house power system 24 in the present embodiment.

The charger 4 is connected respectively with the vehicle 3 and to the in-house power system 24 of the house 2, and performs a charge control of the storage battery 31 of the vehicle 3, i.e., charging of the battery 31 by the electric power supplied from the in-house power system 24.

The charger 4 may be electrically connected with the storage battery 31 of the vehicle 3 by a charge cable etc. which is detachable from the vehicle 3, for example. The charger 4 may be electrically connected with the in-house power system 24, for example, by a plug connection to a socket/outlet. The charger 4 has the AC/DC converter 41, the controller 42, and a notifier 43, as shown in FIG. 1.

The AC/DC converter 41 converts an alternate current supplied from the in-house power system 24 to a direct current, and supplies the direct current to the storage battery 31 of the vehicle 3. The AC/DC converter 41 may be electrically connected with the switch board 21 of the in-house power system 24 via the wire L3, for example, by a plug connection to a socket/outlet. The AC/DC converter 41 may also be electrically connected with the storage battery 31 of the vehicle 3 by a charge cable, for example.

The controller 42 controls the supply power amount from the AC/DC converter 41 to the storage battery 31. The controller 42 is configured as communicable with the controller 32 of the vehicle 3, and with the high level device 23 of the in-house power system 24 via the wired/wireless channel.

The controller 42 is configured as capable of obtaining the supply power amount to the in-house power system 24 (i.e., a power value of the power line L1 in the present embodiment).

The controller 42 determines the supply power amount of the AC/DC converter 41 basically according to the instruction value of the charge amount inputted from the high level device 23 of the in-house power system 24.

Hereafter, a control that determines the supply power amount according to the instruction value from the high level device 23 in such manner may also be designated as "a first control".

Further, when the controller 42 is not communicable with the high level device 23 of the in-house power system 24, the controller 42 may be capable of independently determining the supply power amount of the AC/DC converter 41 without having an instruction from the high level device 23, i.e., according to information about a past power supply from the in-house power system 24.

Hereafter, a control that determines the supply power amount according to, or with reference to, the information about the past power supply from the in-house power system 24 in such manner may also be designated as "a second control".

In the present embodiment, the controller 42 specifically uses "a power restriction value of the in-house power system 24" as "the information about the past power supply from the in-house power system 24." That is, the controller 42 switches the first control and the second control described above depending on whether the communication between the controller 42 and the high level device 23 of the in-house power system 24 is enabled/disabled, for determining the supply power amount from the AC/DC converter 41 to the storage battery 31 of the vehicle 3. The details of a switch process for switching of the charge control by the controller 42 are described later with reference to FIG. 2.

Further, the controller 42 monitors an actual power value (i.e., in the present embodiment, a power value of the power line L1) of the in-house power system 24, and memorizes the power restriction value of the in-house power system 24 in the past.

The controller 42 is provided with the following function blocks, i.e., a power amount controller 421, a determiner 422, and a memory 423 (i.e., a charge control memory unit) for providing the above-mentioned functions.

The power amount controller 421 performs the first control and the second control mentioned above, and controls the supply power amount of charge control.

The power amount controller 421 switches which one of the first control and the second control is performed according to the determination result of the determiner 422 (i.e., a determination result of whether communication with the high level device 23 is enabled).

The power amount controller 421 performs the first control, when the communication with the high level device 23 is determined as enabled by the determiner 422, and performs the second control when the communication with the high level device 23 is determined as disabled by the determiner 422.

When performing the second control, the power amount controller 421 controls the supply power amount of the charge control so that the actual power value supplied to the in-house power system 24 does not exceed the power restriction value of the in-house power system 24 which is memorized in the memory 423.

The determiner 422 determines whether the high level device 23 exists or not, i.e., is available or not. More specifically, the determiner 422 determines whether communication with the high level device 23 is enabled or disabled. The determination method by the determiner 422 is later mentioned with reference to FIG. 2.

The memory 423 memorizes the information about the power restriction value of the in-house power system 24 based on the supply power amount of the in-house power system 24 obtained by the monitoring function of the controller 42. Further, the memory 423 may obtain the information about the power restriction value directly as an input from the user for memorizing such information.

When the determiner 422 of the controller 42 determines that no high level device 23 exists (i.e., the communication with the high level device 23 is disabled), the notifier 43 notifies the user that no high level device 23 exists. The notification to the user from the notifier 43 may, for example, be provided as a display of a message on a display unit, an e-mail sent to the user's hand-held terminal or the like.

Figure 2:
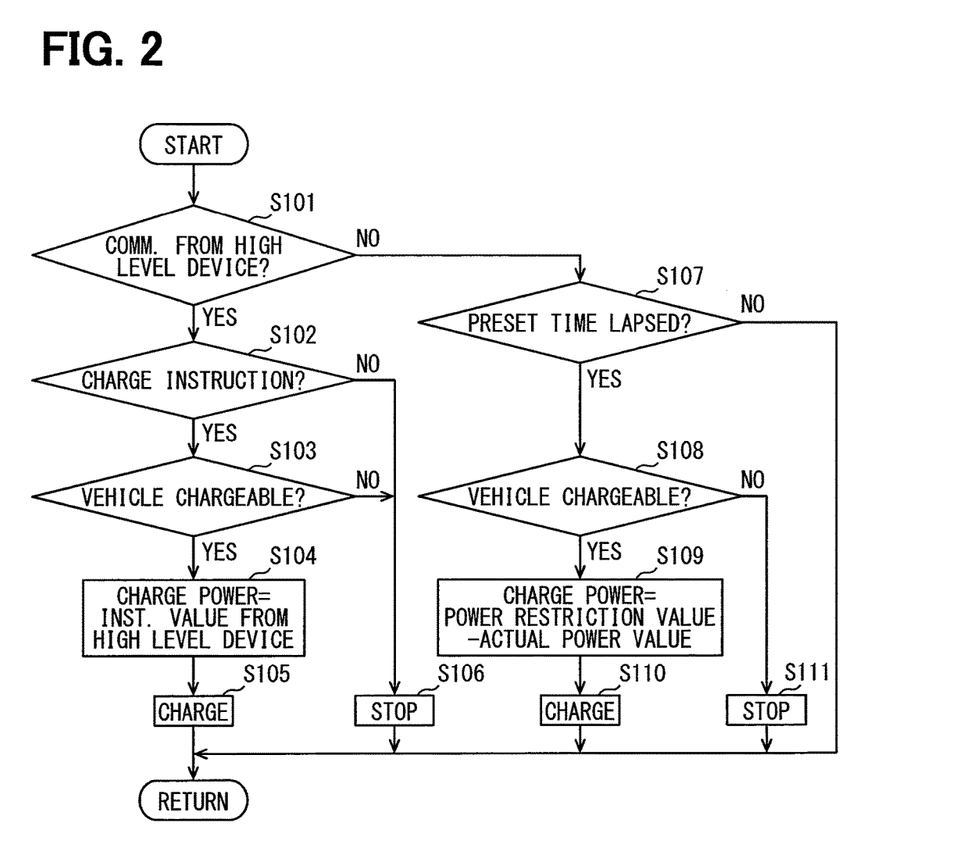
FIG. 2 is a flowchart of a switch process of a charge control performed by the charger concerning a first embodiment of the present disclosure.

Next, with reference to the flowchart of FIG. 2, the switch process of the charge control performed by the charger 4 concerning the first embodiment is described. The control shown in FIG. 2 is performed by the controller 42 of the charger 4 at preset intervals.

In Step S101, it is determined by the determiner 422 whether any communication is performed from the high level device 23 of the in-house power system 24. The determiner 422 determines, for example, that the communication from the high level device 23 is performed when information regularly transmitted from the high level device 23 is received at the present intervals.

As a result of the determination of Step S101, when it is determined that the communication from the high level device 23 is performed (Yes of Step S101), the process proceeds to Step S102, and, when it is determined that no communication is performed therefrom (No of Step S101), the process proceeds to Step S107.

In Steps S102-S106, the first control is performed, in which the supply power amount from the AC/DC converter 41 to the storage battery 31 is determined according to the instruction value from the high level device 23, since it is already determined in S101 that the communication from the high level device 23 is performed.

First, in Step S102, it is determined by the power amount controller 421 whether any charge instruction is received from the high level device 23. The power amount controller 421 may determine that a charge instruction from the high level device 23 is received when, for example, a charge instruction (i.e., an instruction value of the charge power amount) is included in the information described in Step S101, i.e., in the information regularly transmitted from the high level device 23.

As a result of the determination of Step S102, when it is determined that a charge instruction is received from the high level device 23 (Yes of Step S102), the process proceeds to Step S103, and, when no charge instruction is received (No of Step S102), the process proceeds to Step S106.

In Step S103, since a charge instruction is received from the high level device 23 in Step S102, it is determined by the power amount controller 421 whether the storage battery 31 in the vehicle 3 is in a chargeable state (i.e., VEHICLE CHARGEABLE? in FIG. 2). The power amount controller 421 may obtain the information about the state of the storage battery 31 from the controller 32 of the vehicle 3, and may use the obtained information for the determination of chargeability of the battery 31, for example.

As a result of the determination of Step S103, when the battery 31 in the vehicle 3 is in a chargeable state (Yes of Step S103), the process proceeds to Step S104, and, when the battery 31 in the vehicle 3 is in a non-chargeable state (No of Step S103), the process proceeds to Step S106.

In Step S104, since it is already determined in Step S103 that the battery 31 in the vehicle 3 is chargeable, the power amount controller 421 sets the amount of the charge power to the instruction value from the high level device 23. That is, in such case, the amount of the charge power is the supply power amount from the AC/DC converter 41 to the storage battery 31, and the amount of the electric power is set to be equal to the instruction value from the high level device 23 (i.e., the charge power=the instruction value from the high level device 23). When the process of Step S104 is complete, the process proceeds to Step S105.

In Step S105, the power amount controller 421 controls the AC/DC converter 41 so that the charge of the electric power is performed by the amount of the electric power set up in Step S104 (i.e., according to the instruction value from the high level device 23). When the process of Step S105 is complete, the control of FIG. 2 is finished.

In Step S106, a situation is either of the two, i.e., (i) no charge instruction from the high level device 23 in Step S102 or (ii) the non-chargeable state in Step S103. Therefore, the power amount controller 421 controls the AC/DC converter 41 not to perform the charge control but to be put in a stop state. When the process of Step S106 is complete, the control of FIG. 2 is finished.

In Step S107, a situation is that it is determined in Step S101 that no regular communication is performed from the high level device 23. Therefore, it is determined by the determiner 422 whether such a situation is continuing for a preset time (i.e., a lapse of the preset time).

When it is determined that the preset time has lapsed (Yes of Step S107), the process proceeds to Step S108, and, when it is determined that the preset time has not lapsed (No of Step S107), the control of FIG. 2 is finished.

In Steps S108-S111, a situation is that it is determined that no regular communication is performed from the high level device 23 for the preset time as a result of the determinations of Step S101 and S107. Therefore, based on an assumption that the charger 4 is not communicable with the high level device 23, the second control is performed in which the supply power amount from the AC/DC converter 41 to the storage battery 31 is determined according to the information about the past power supply from the in-house power system 24.

First, in Step S108, it is determined by the power amount controller 421 whether the storage battery 31 in the vehicle 3 is in a chargeable state (i.e., VEHICLE CHARGEABLE? in FIG. 2). The determination of Step S108 is the same as that of Step S103.

As a result of the determination of Step S108, when it is determined that the battery 31 in the vehicle 3 is in the chargeable state (Yes of Step S108), the process proceeds to Step S109, and, when the battery 31 in the vehicle 3 is the non-chargeable state (No of Step S108), the process proceeds to Step S111.

In Step S109, since the battery 31 in the vehicle 3 is already determined in Step S108 as chargeable, the power amount controller 421 sets the amount of the charge power (i.e., the supply power amount from the AC/DC converter 41 to the storage battery 31) to a value that is calculated by subtracting the actual electric power of the in-house power system 24 from the power restriction value of the in-house power system 24, which is memorized in the memory 423

(i.e., the charge power=the power restriction value–the actual power value). That is, the power amount controller 421 controls the supply power amount of the charge control so that the actual power value supplied to the in-house power system 24 does not exceed the power restriction value of the in-house power system 24.

When the process of Step S109 is complete, the process proceeds to Step S110.

In Step S110, the power amount controller 421 controls the AC/DC converter 41 so that the charge of the electric power is performed by the amount of the electric power set up in Step S109 (i.e., the charge power=the power restriction value–the actual power value). When the process of Step S110 is complete, the control of FIG. 2 is finished.

In Step S111, the power amount controller 421 controls the AC/DC converter 41 not to perform the charge control but to be put in the stop state, since it is already determined in Step S108 that the battery 31 in the vehicle 3 is in the non-chargeable state. When the process of Step S111 is complete, the control of FIG. 2 is finished.

In the charger 4 of the first embodiment, as described above, when the power amount controller 421 of the controller 42 is not communicable with the high level device 23, instead of performing the first control that uses the instruction value from the high level device 23, the second control that uses the information about the past power supply from the in-house power system 24 (i.e., the power restriction value of the in-house power system in the present embodiment) is performed for the determination of the supply power amount of the charge control.

By devising such a configuration, the charger 4 can independently set the supply power amount for the charge control in an appropriate manner, i.e., without relying on the high level device 23, regardless of whether the charger 4 is non-communicable with the high level device 23 of the in-house power system 24.

As a result, when performing the charge control of the storage battery 31, i.e., the supply of the electric power is performed between the storage battery 31 of the vehicle 3 and the in-house power system 24, the electric power supply can be performed securely, without causing the operation of the breaker of the in-house power system 24 to interrupt the power supply.

Further, the power amount controller 421 of the controller 42 controls the supply power amount of the charge control by the charger 4 in the first embodiment so that the actual power value supplied to the in-house power system 24 does not exceed "the power restriction value of the in-house power system" when performing the second control.

The power restriction value is the information appropriately set up by the high level device 23 in the past, and is the amount/value of the electric power which does not cause the breaker of the in-house power system 24 to operate (i.e., to interrupt the electric power).

Therefore, even when the charger 4 is not communicable with the high level device 23 of the in-house power system 24, the charger 4 can appropriately set up the supply power amount of the charge control in the range in which the breaker does not operate.

Further, in the charger 4 of the first embodiment, the determiner 422 of the controller 42 determines that the communication with the high level device 23 of the in-house power system 24 is disabled when no communication is performed from the high level device 23 for the preset time. Therefore, the communication disabled state of the high level device 23, i.e., the charger 4 being non-communicable with the high level device 23, is accurately determined.

Further, in the charger 4 of the first embodiment, the notifier 43 notifies the user of the communication disabled state of the high level device 23 when the determiner 422 of the controller 42 determines such a state of the high level device 23. Therefore, the communication disabled state of the high level device 23 is quickly notified to the user.

Modification of the First Embodiment

Next, the modification of the first embodiment is described.

Although a configuration in the first embodiment is described in which "the power restriction value of the in-house power system 24" is used as a reference value by the charger 4 to determine the supply power amount of the charge control in the second control, the reference value may also be any value as long as the value is "the information about the past power supply of the in-house power system 24", i.e., the reference value may be a value other than the power restriction value.

For example, "the instruction value of the supply power amount of the charge control inputted from the high level device 23 in the past" may also be used as "the information about the past power supply of the in-house power system 24."

In such case, the information about the instruction value which the power amount controller 421 received in the past from the high level device 23 is memorized in the memory 423 of the controller 42. As the information about the instruction value memorized in the memory 423, any values arbitrarily extracted from a group of the past instruction values, e.g., the maximum value, the average value, or the minimum value, as well as the values derived from the calculation of a group of values, etc., may be used, for example.

The power amount controller 421 controls, at the time of performing the second control, the supply power amount of the charge control so that the actual power value supplied to the in-house power system 24 does not exceed the instruction value memorized in the memory 423. That is, in the flowchart of FIG. 2, the "the power restriction value" in Step S109 is replaced with "the instruction value" (i.e., the charge power=the instruction value–the actual power value).

Further, "the past value that is the actual power value supplied in the past to the in-house power system 24" may also be used as "the information about the past power supply of the in-house power system 24."

In such case, the supply power amount of the in-house power system 24 obtained by the monitoring function of the controller 42 is memorized in the memory 423 of the controller 42 as the past value that is "the actual power value supplied in the past to the in-house power system 24," which may also be simply designated as "the past value."

As the information about "the past value" memorized in the memory 423, any values arbitrarily extracted from a group of the past supply power amounts of the in-house power system 24, e.g., the maximum value, the average value, and/or the minimum value, as well as the values derived from the calculation of a group of values, etc. may be used, for example.

At the time of performing the second control, the power amount controller 421 controls the supply power amount of the charge control so that the actual power value supplied to the in-house power system 24 does not exceed "the past value" memorized in the memory 423. That is, in the flowchart of FIG. 2, "the power restriction value" in Step S109 is replaced with "the past value" (i.e., the charge power=the past value−the actual power value).

Further, when "the past value" (i.e., the past value that is the actual power value supplied in the past to the in-house power system 24") is used as "the information about the past power supply of the in-house power system 24", a time parameter may also be taken into consideration for controlling the supply power amount of the charge control.

Figure 3:
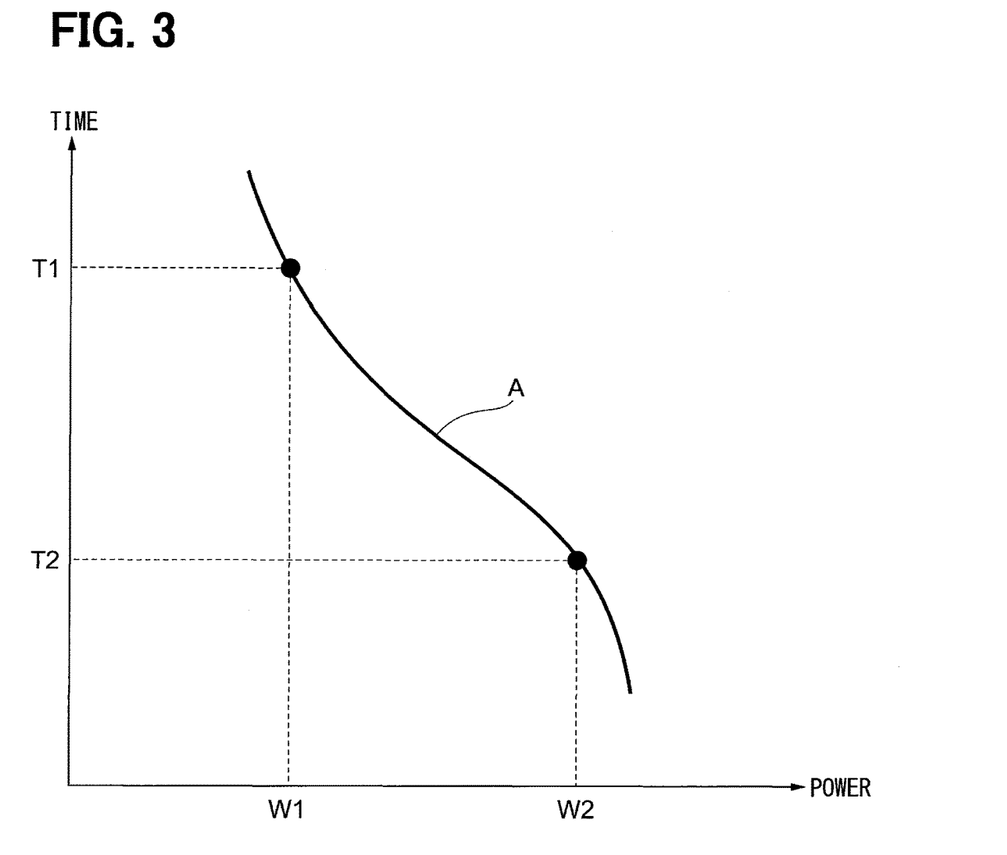
FIG. 3 is an illustration of a setting method for setting a threshold for a power value (i.e., a past value) in a modification of the first embodiment of the present disclosure.

As shown in FIG. 3, a conventional threshold setting method using a two-dimensional graph may be used for the setting of the breaker capacity. That is, in the graph of FIG. 3, the vertical axis of the graph represents a lapse time of an excess electric power and the horizontal axis of the graph represents an amount of the electric power, and the lapse time is associated with the amount of the electric power by a characteristic curve of the graph that is specific to the breaker. Therefore, when a power value W1 is small, a lapse time T1, which is a relatively large value, is set as the threshold value, and when a power value W2 is relatively large, a relatively-small lapse time T2 is set as the threshold value.

This concept is applicable to the present embodiment. That is, when the allowable time is stored in the memory 423 in association with the past value, the power amount controller 421 may perform the second control by applying an allowable time rule, i.e., the second control is performed to regulate the actual power value supplied to the in-house power system 24 not to exceed the past value memorized in the memory 423 continuously for more than a predetermined allowable time (i.e., an excess power value exceeding the past value may be supplied to the in-house power system 24 only for a period up to the allowable time). In such a rule, the set of (i) the past value memorized in the memory 423 and (ii) the allowable time may be plotted/calculated as a point on a characteristic curve A in FIG. 3, as discussed in the above as (W1, T1), (W2, T2).

The charger 4 of the first embodiment may also be configured not to perform the second control (i.e., the process of Steps S108-S111 of FIG. 2 is not performed) even when the communication with the high level device 23 is determined as disabled by the determiner 422 of the controller 42, if the high level device 23 transmits an advance instruction to the charger 4.

Further, the charger 4 of the first embodiment may also be configured to perform the charge control at a low price timing, i.e., when the price of the electric power is low, for the reduction of the charge cost.

Further, the configuration of the first embodiment which uses the wired/wireless channel for the communication between the controller 42 of the charger 4 and the high level device 23 of the in-house power system 24 may be replaced with other configuration in which the communication therebetween is performed via a dedicated line/channel, for the improvement of the speed and the accuracy of the communication.

Further, in the configuration of the first embodiment, as shown in FIG. 1, the electric power from the commercial power system 5 is supplied to the loads 22 via the branch breaker 212 and is supplied to the charger 4 via the branch breaker 213, i.e., via respectively different, two breakers of the in-house power system 24. However, the power supply to the loads 22 and to the charger 4 may be performed via the same branch breaker.

Further, the system for supplying the electric power to the charger 4 may be any power system, as long as the power system is disposed outside of the vehicle 3. That is, the power supply system may be not necessarily limited to the in-house power system 24 for the general/ordinary household exemplarily described in the first embodiment.

Second Embodiment

The second embodiment is described with reference to FIGS. 4 and 5. In the second embodiment, a charger-discharger 4A is described as an example of the power supply controller concerning the present disclosure.

Figure 4:
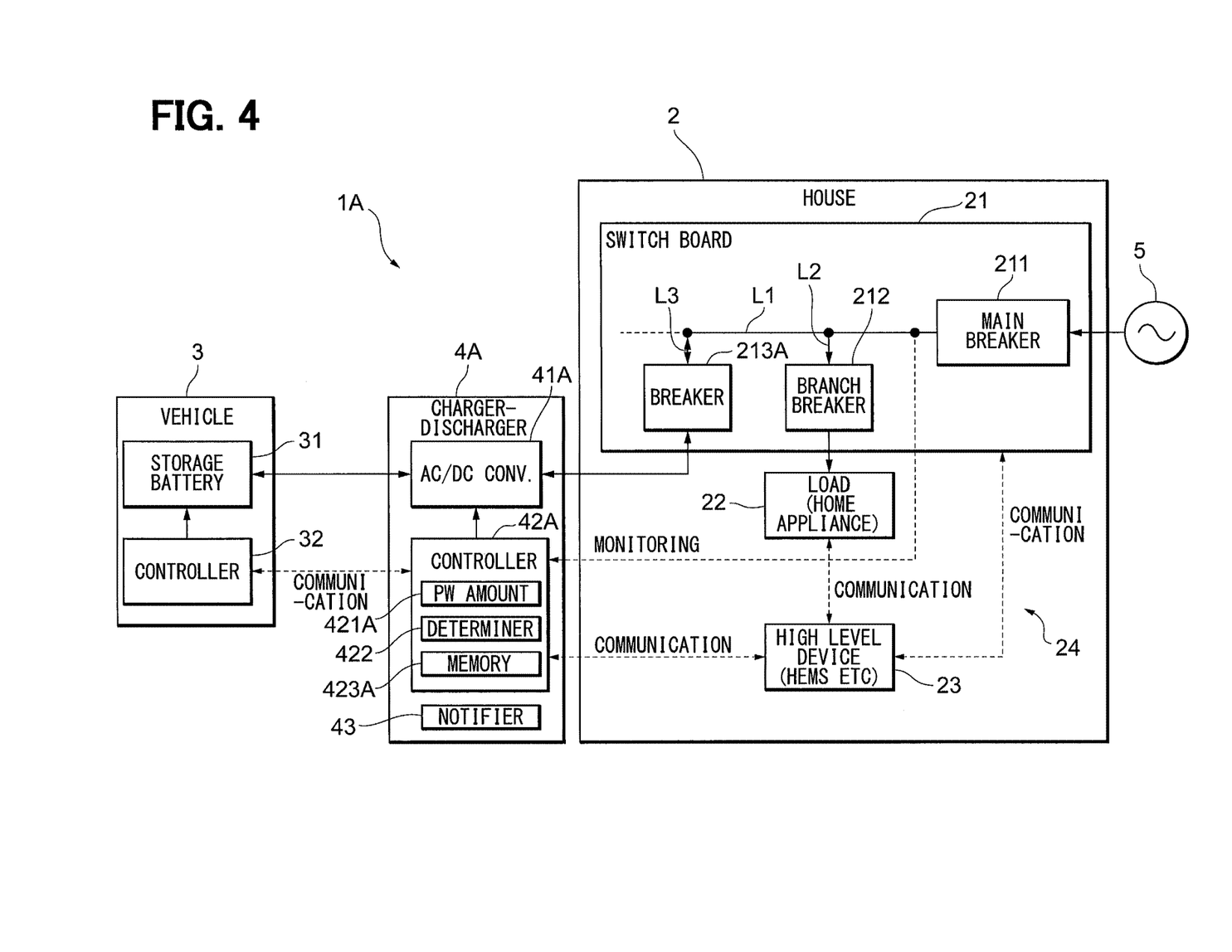
FIG. 4 is a block diagram of the power supply system that is applied to the charger (i.e., the power supply controller) concerning a second embodiment of the present disclosure.

A power supply system 1A shown in FIG. 4 is different from the system 1 in the first embodiment in the following points. That is, the system 1A is provided with the charger-discharger 4A that is connected with both of the vehicle 3 and the in-house power system 24 of the house 2.

The charger-discharger 4A is configured as capable of performing the same charge control as the charger 4 of the first embodiment, and is also configured as capable of performing a discharge control, which discharges the electric power from the storage battery 31 of the vehicle 3 to the in-house power system 24. The charger-discharger 4A has an AC/DC power converter 41A, a controller 42A, and a notifier 43, as shown in FIG. 4.

The AC/DC power converter 41A replaces the AC/DC converter 41 of the first embodiment. The AC/DC power converter 41A converts the AC power supplied from the in-house power system 24 to the DC power, supplies the DC power to the storage battery 31 of the vehicle 3, and also converts the DC power supplied from the storage battery 31 of the vehicle 3 to the AC power, and supplies the AC power to the in-house power system 24. The AC/DC power converter 41A is connected with the switch board 21 of the in-house power system 24 by the wire L3.

A breaker 213A, disposed on the wire L3, interrupts the electric power supply from the commercial power system 5 to the charger-discharger 4A, when the breaker 213A operates at a time of performing the charge control, and interrupts the electric power supply from the charger-discharger 4A (i.e., from the storage battery 31) to the in-house power system 24 when the breaker 213A operates at a time of performing the discharge control.

In the present embodiment, "causing the operation of the breaker of the in-house power system 24" means that at least one of the breakers 211, 212, 213A in the in-house power system 24 is put in the interrupted state by the flow of the excessive electric current, i.e., by a flow of the electric current exceeding a capacity of the breaker 211, 212 or 213A.

Further, "the breaker interrupting the power supply from the commercial power system 5 to the loads 22 when the breaker operates" refers to the main breaker 211, the branch breaker 212, or the breaker 213A.

The controller 42A controls the supply power amount from the AC/DC power converter 41A to the storage battery 31 at the time of the charge control just like the controller 42 of the first embodiment, and controls the supply power amount from the AC/DC power converter 41A to the in-house power system 24 at the time of the discharge control.

The controller 42A switches and performs the first control and the second control at the time of the charge control, just like the controller 42 of the first embodiment, and also switches and performs the first control and the second control at the time of the discharge control, for determining the supply power amount from the AC/DC power converter 41A to the in-house power system 24.

The controller 42A is provided with a power amount controller 421A, the determiner 422, and a memory 423A (i.e., the charge control memory unit, a discharge control memory unit) for providing the above-mentioned functions.

In addition to the functions of the power amount controller 421 in the first embodiment, the power amount controller 421A performs the first control and the second control mentioned above for the control of the supply power amount of the discharge control. That is, at a time of performing the second control, the power amount controller 421A controls the supply power amount of the discharge control so that the actual power value supplied to the in-house power system 24 does not exceed the power restriction value of the in-house power system 24 memorized in the memory 423A.

The memory 423A memorizes the information about the power restriction value of the in-house power system 24 based on the supply power amount of the in-house power system 24 obtained by the monitoring function of the controller 42A. Further, the memory 423A may obtain the information about the power restriction value directly by an input from the user, and may memorize such information.

Figure 5:
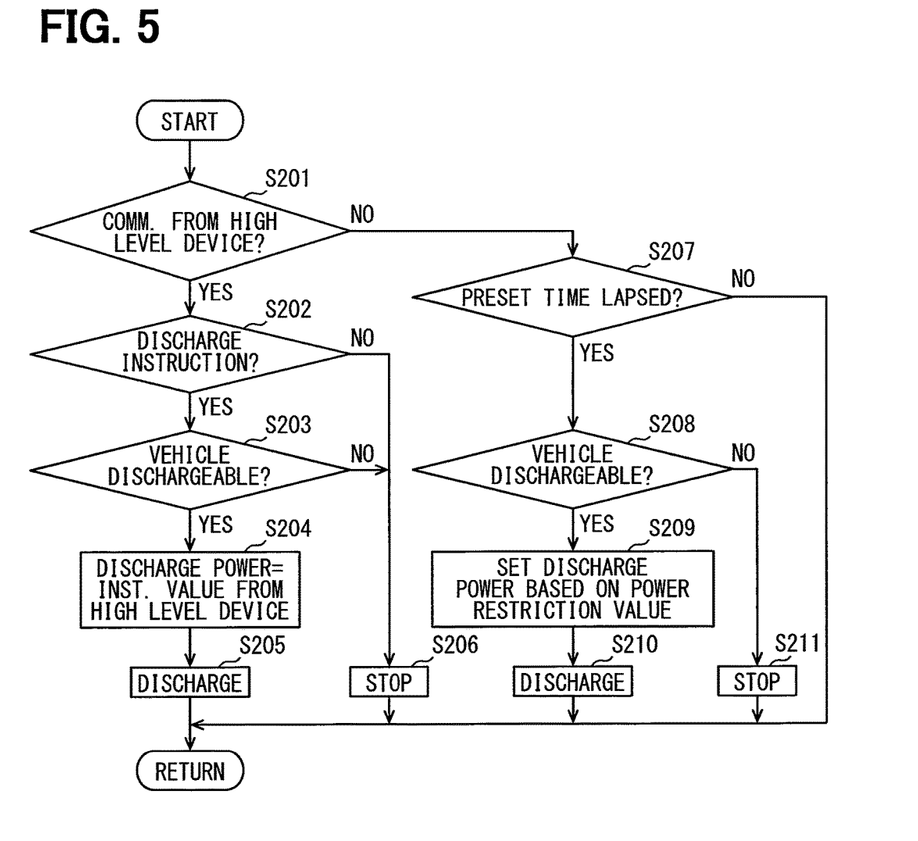
FIG. 5 is a flowchart of the switch process of a discharge control performed by a charge-discharge device concerning the second embodiment of the present disclosure.

The charger-discharger 4A performs the switch process of the charge control according to the flowchart of FIG. 2, and performs the switch process of the discharge control according to the flowchart of FIG. 5.

The switch process of the discharge control is described with reference to the flowchart of FIG. 5. The control shown in FIG. 5 is performed by the controller 42A of the charger-discharger 4A at preset intervals, for example.

In Step S201, it is determined by the determiner 422 whether any communication is performed from the high level device 23 of the in-house power system 24. The determiner 422 determines, for example, that the communication from the high level device 23 is performed when the information regularly transmitted from the high level device 23 is received at the preset intervals.

As a result of the determination of Step S201, when it is determined that the communication from the high level device 23 is performed (Yes of Step S201), the process proceeds to Step S202, and, when it is determined that no communication is performed (No of Step S201), the process proceeds to Step S207.

In Steps S202-S206, the first control is performed, in which the supply power amount from the AC/DC power converter 41A to the in-house power system 24 is determined according to the instruction value from the high level device 23, since it is already determined in Step S201 that the communication from the high level device 23 is performed.

More practically, in Step S202, it is determined by the power amount controller 421A whether any discharge instruction is received from the high level device 23. The power amount controller 421A may determine that a discharge instruction from the high level device 23 is received when, for example, a discharge instruction (i.e., an instruction value of the discharge power amount) is included in the information described in Step S201, i.e., in the information regularly transmitted from the high level device 23.

As a result of the determination of Step S202, when it is determined that the discharge instruction is received from the high level device 23 (Yes of Step S202), the process proceeds to Step S203, and, when it is determined that no discharge instruction is received (No of Step S202), the process proceeds to Step S206.

In Step S203, since a discharge instruction is received from the high level device 23 in Step S202, it is determined by the power amount controller 421A whether the storage battery 31 in the vehicle 3 is in a dischargeable state (i.e., VEHICLE DISCHARGEABLE? in FIG. 5). The power amount controller 421A may obtain the information about the amount of the stored power in the storage battery 31 from the controller 32 of the vehicle 3, and may use the obtained information for the determination of dischargeability of the battery 31, for example.

As a result of the determination of Step S203, when the battery 31 in the vehicle 3 is in a dischargeable state (Yes of Step S203), the process proceeds to Step S204, and, when the battery 31 is not in a dischargeable state (No of Step S203), the process proceeds to Step S206.

In Step S204, since it is already determined in Step S203 that the battery 31 in the vehicle 3 is dischargeable, the power amount controller 421A sets the amount of the discharge power (i.e., the supply power amount from the AC/DC power converter 41A to the in-house power system 24) is set to the instruction value from the high level device 23 (i.e., the discharge power=the instruction value from the high level device 23). When the process of Step S204 is complete, the process proceeds to Step S205.

In Step S205, the power amount controller 421A controls the AC/DC power converter 41A so that the discharge of the electric power is performed by the amount of the electric power set up in Step S204 (i.e., according to the instruction value from the high level device 23). When the process of Step S205 is complete, the control of FIG. 5 is finished.

In Step S206, a situation is either of the two, i.e., (i) no discharge instruction from the high level device 23 in Step S202 or (ii) the non-dischargeable state in Step S203. Therefore, the power amount controller 421A controls the AC/DC power converter 41A not to perform the discharge control but to be in a stop state. When the process of Step S206 is complete, the control of FIG. 5 is finished.

In Step S207, a situation is that it is determined in Step S201 that no regular communication is performed from the high level device 23. Therefore, it is determined by the determiner 422 whether such a situation is continuing for a preset time (i.e., a lapse of the preset time).

When it is determined that the preset time has lapsed (Yes of Step S207), the process proceeds to Step S208, and, when it is determined that the preset time has not lapsed (No of Step S207), the control of FIG. 5 is finished.

In Steps S208-S211, a situation is that it is determined that no regular communication is performed from the high level device 23 for the preset time as a result of the determinations of Step S201 and S207. Therefore, based on an assumption that the charger 4 is not communicable with the high level device 23, the second control is performed in which the supply power amount from the AC/DC converter 41A to the in-house power system 24 is determined according to the information about the past power supply from the in-house power system 24.

More practically, in Step S208, it is determined by the power amount controller 421A whether the storage battery 31 in the vehicle 3 is in a dischargeable state (i.e., VEHICLE DISCHARGEABLE? in FIG. 5). The determination of Step S208 is the same as that of Step S203.

As a result of the determination of Step S208, when it is determined that the battery 31 in the vehicle 3 is in the dischargeable state (Yes of Step S208), the process proceeds to Step S209, and when it is determined that the battery 31 in the vehicle 3 is in the non-dischargeable state (No of Step S208), the process proceeds to Step S211.

In Step S209, since the battery 31 in the vehicle 3 is already determined as dischargeable in Step S208, the power amount controller 421A sets the amount of the discharge power (i.e., the supply power amount from the AC/DC power converter 41A to the in-house power system 24)

based on the power restriction value of the in-house power system 24 memorized in the memory 423A. Specifically, the power amount controller 421A controls the supply power amount of the discharge control so that the actual power value supplied to the in-house power system 24 does not exceed the power restriction value of the in-house power system 24.

When the process of Step S209 is complete, the process proceeds to Step S210.

In Step S210, the power amount controller 421A controls the AC/DC power converter 41A so that the discharge of the electric power is performed by the amount of the electric power set up in Step S209. That is, the power amount controller 421A controls the supply power amount from the AC/DC power converter 41A to the in-house power system 24 so that the actual power value supplied to the in-house power system 24 does not exceed the power restriction value of the in-house power system 24.

When the process of Step S210 is complete, the control of FIG. 5 is finished.

In Step S211, the power amount controller 421A controls the AC/DC power converter 41A not to perform the discharge control but to be in the stop state, since it is already determined in Step S208 that the battery 31 in the vehicle 3 is in the non-dischargeable state. When the process of Step S211 is complete, the control of FIG. 5 is finished.

As described in the above, the charger-discharger 4A of the second embodiment is configured in the following manner.

That is, when the power amount controller 421A of the controller 42A is not communicable with the high level device 23, instead of performing the first control that uses the instruction value from the high level device 23, the second control that determines the supply power amount of the charge control according to the information about the past power supply from the in-house power system 24 (i.e., the power restriction value of the in-house power system in the present embodiment) is performed.

By devising such a configuration, the charger-discharger 4A can independently set the supply power amount of the charge control and the discharge control in an appropriate manner, without relying on the high level device 23, regardless of whether the charger 4 is non-communicable with the high level device 23 of the in-house power system 24.

As a result, when performing the charge control and the discharge control involving the in-house power system 24 and the storage battery 31 of the vehicle 3, (i.e., when performing the charge control of the storage battery 31 of the vehicle 3 or performing the discharge control to the in-house power system 24) the power supply can be performed securely, without causing the operation of the breaker of the in-house power system 24 to interrupt the power supply and the like.

Further, since the charger-discharger 4A of the second embodiment includes the same function as the charger 4 of the first embodiment, the same effects as the charger 4 of the first embodiment mentioned above are also achievable.

Modification of the Second Embodiment

A modification of the second embodiment is described in the following.

The configuration of the second embodiment is about the use of "the power restriction value of the in-house power system 24" as a reference value by the charger-discharger 4A to determine the supply power amount of the charge control and the discharge control in the second control. However, the reference value may be any information as long as the information is about "the past power supply of the in-house power system 24".

For example, "the past value that is the actual power value supplied in the past to the in-house power system 24" may be used as "the information about the past power supply of the in-house power system 24." In such case, the supply power amount of the in-house power system 24 obtained by the monitoring function of the controller 42 is memorized in the memory 423A of the controller 42A as "a past value that is the actual power value supplied in the past to the in-house power system 24."

As the information about "the past value" memorized in the memory 423A, any values arbitrarily extracted from a group of the past supply power amounts of the in-house power system 24, e.g., the maximum value, the average value, or the minimum value, as well as the values derived from the calculation of a group of values, etc., may be used, for example.

The power amount controller 421A controls, at the time of performing the second control, the supply power amount of the charge control and the discharge control so that the actual power value supplied to the in-house power system 24 does not exceed the past value memorized in the memory 423A. That is, in the flowchart of FIG. 5, "the power restriction value" in Step S209 is replaced with "the past value", and the discharge power is set up based on the past value.

Further, when "the past value that is the actual power value supplied in the past to the in-house power system 24" is used as "the information about the past power supply of the in-house power system 24", the configuration of the discharge control may also take the time parameter into consideration for controlling the supply power amount of the discharge control, just like the modification of the first embodiment described above.

The charger-discharger 4A of the second embodiment may also be configured not to perform the second control (i.e., the process of Steps S108-S111 of FIG. 2 is not performed/the process of Steps S208-S211 of FIG. 5 is not performed) even when the communication with the high level device 23 is determined as disabled by the determiner 422A of the controller 42A, if the high level device 23 transmits an advance instruction to the charger-discharger 4A.

Further, the charger-discharger 4A of the second embodiment may perform the charge control at a low price timing, i.e., when the price of the electric power is low, for the reduction of the charge cost.

Further, in the second embodiment, the configuration of the controller 42A of the charger-discharger 4A is described as performing communication with the high level device 23 of the in-house power system 24 via the wired/wireless channel. However, the communication therebetween may also be performed via a dedicated line/channel, for the improvement of the speed and the accuracy thereof.

Further, the system for supplying the electric power to the charger-discharger 4A may be any power system, as long as the power system is disposed outside of the vehicle 3. That is, the power supply system may be not necessarily limited to the in-house power system 24 for the general/ordinary household exemplarily described in the second embodiment.

Further, in the second embodiment and the modification thereof, one of "the power restriction value of the in-house power system 24" and "the past value that is the actual power value supplied in the past to the in-house power system 24" is used as a reference value for determining the supply power amount of both of the charge control and the discharge control. However, respectively different information, i.e., two different values, may be used for the charge control and the discharge control.

In the charge control, for example, one of "the power restriction value of the in-house power system 24", "the instruction value of the supply power amount of the charge control inputted from the high level device 23 in the past", "the past value that is the actual power value supplied in the past to the in-house power system 24", and other information may be used as the reference value, and, in the discharge control, one of "the power restriction value of the in-house power system 24", "the past value that is the actual power value supplied in the past to the in-house power system 24", and other information may be used as the reference value.

Further, a reason for not using, in the discharge control, "the instruction value of the supply power amount of the charge control inputted from the high level device 23 in the past" that is used in the charge control is as follows.

At the time of performing the discharge control, the electric power is supplied to the in-house power system 24 from two systems, i.e., from the commercial power system 5 and from the storage battery 31. At such time, the instruction value of the discharge control from the high level device 23 to the charger-discharger 4A is determined based on the power demand of the in-house power system 24, e.g., in a manner that supplements the supply power amount from the commercial power system 5 which is falling short of the power demand of the system 24. That is, since the instruction value of the discharge control from the high level device 23 is not set based on the full power amount of the in-house power system 24 nor the breaker capacity, using such an instruction value for the determination of the supply power amount in the discharge control may cause an abnormal voltage, i.e., may apply an excess voltage to the in-house power system 24, when the supply power amount from the commercial power system 5 is sufficient during the discharge control.

Third Embodiment

The third embodiment is described in the following with reference to FIG. 6. The third embodiment describes a discharger 4B as an example of the power supply controller concerning the present disclosure.

Figure 6:
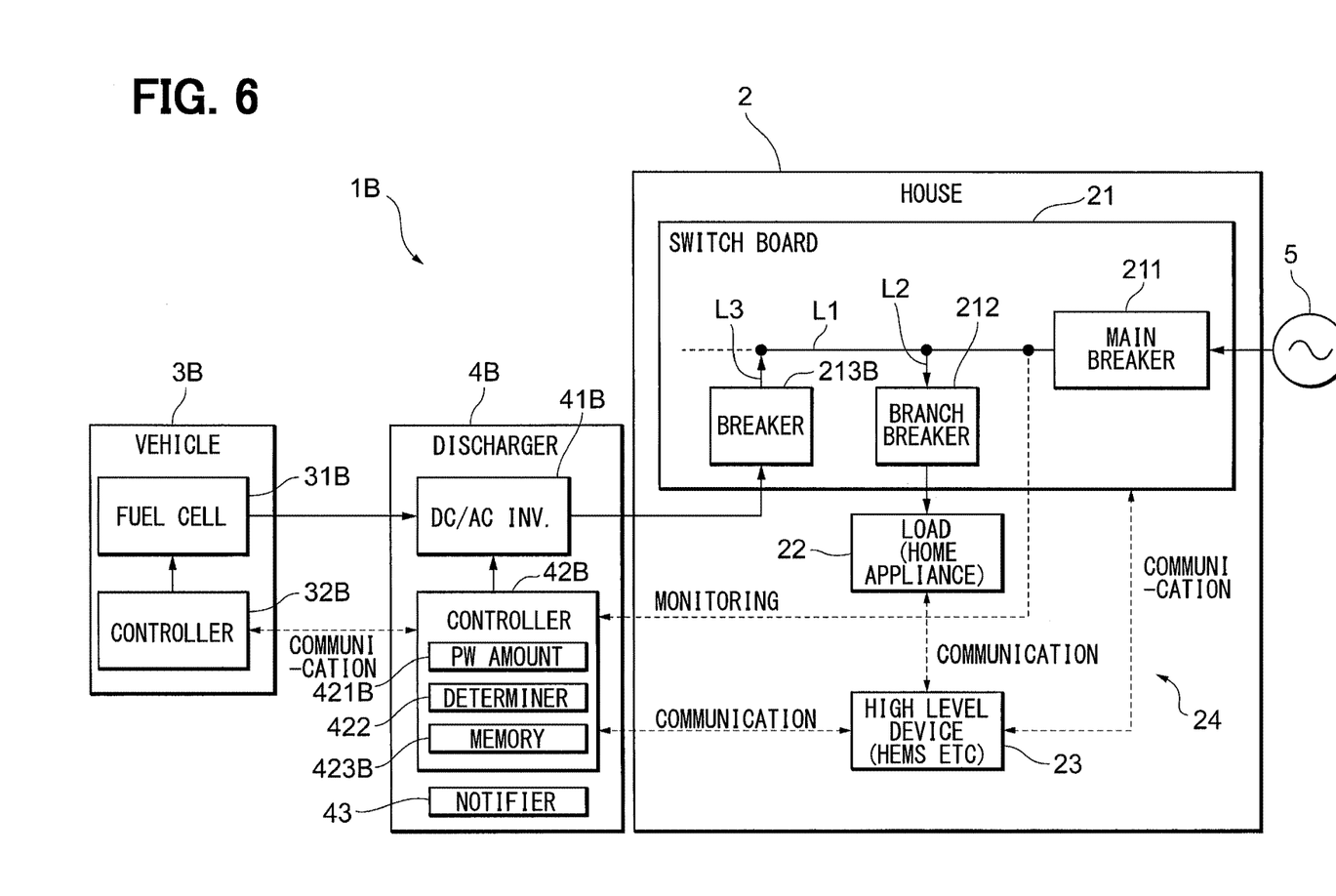
FIG. 6 is a block diagram of the power supply system that is applied to a discharger (i.e., the power supply controller) concerning a third embodiment of the present disclosure.

A power supply system 1B shown in FIG. 6 is different from the power supply system 1 of the first embodiment and from the power supply system 1A of the second embodiment in that the system 1B is provided with the discharger 4B that is connected with both of a vehicle 3B and the in-house power system 24 of the house 2.

The vehicle 3B may, for example, be a fuel cell vehicle in which a fuel cell 31B is disposed for a power generation by using hydrogen and for a travel of the vehicle by using an electric motor that uses the generated power from the fuel cell 31B.

The discharger 4B is configured to perform the discharge control that is described as one of the functions of the charger-discharger 4A of the second embodiment. The discharger 4B is provided with a DC/AC inverter 41B, a controller 42B, and a notifier 43, as shown in FIG. 6.

The DC/AC inverter 41B replaces the AC/DC converter 41 of the first embodiment. The DC/AC inverter 41B converts the DC power supplied from the fuel cell 31B of the vehicle 3B to the AC power, and supplies the AC power to the in-house power system 24. The DC/AC inverter 41B is connected with the switch board 21 of the in-house power system 24 by the wire L3.

A breaker 213B disposed on the wire L3 interrupts a supply of the electric power from the discharger 4B (i.e., from the fuel cell 31B) to the in-house power system 24, when the breaker 213B operates at a time of performing the discharge control.

In the present embodiment, "causing the operation of the breaker of the in-house power system 24" means that at least one of the breakers 211, 212, 213B in the in-house power system 24 is put in the interrupted state by the flow of the excessive electric current, i.e., by a flow of the electric current exceeding a capacity of the breaker 211, 212 or 213.

Further, "the breaker interrupting the power supply from the commercial power system 5 to the loads 22 when the breaker operates" refers to the main breaker 211, the branch breaker 212, or the breaker 213B.

The controller 42B controls the supply power amount from the DC/AC inverter 41B to the in-house power system 24 at the time of the discharge control. The controller 42B, in configuration, switches the first control and the second control, just like the controller 42A of the second embodiment at the time of the discharge control, and determines the supply power amount from the DC/AC inverter 41B to the in-house power system 24.

The controller 42B is provided with a power amount controller 421B, the determiner 422, and a memory 423B (i.e., a discharge control memory unit), for performing the above-described functions.

The power amount controller 421B has a function of controlling the supply power amount of the discharge control by performing the first control and the second control, which is one of the functions of the power amount controller 421A of the second embodiment described above.

The power amount controller 421B controls, at a time of performing the second control, the supply power amount of the discharge control so that the actual power value supplied to the in-house power system 24 does not exceed the power restriction value of the in-house power system 24 memorized in the memory 423B. Further, just like the second embodiment, the power restriction value may be replaced with "the past value that is the actual power value supplied in the past to the in-house power system 24".

The memory 423B memorizes the information about the power restriction value of the in-house power system 24 based on the supply power amount of the in-house power system 24 obtained by the monitoring function of the controller 42B. The memory 423B may also be configured as obtaining the information about the power restriction value directly as an input from the user and configured as memorizing such information.

The discharger 4B performs the switch process of the discharge control according to the flowchart of FIG. 5.

Since the discharger 4B of the third embodiment includes the same functions as the one concerning the discharge control of the charger-discharger 4A of the second embodiment, the same effects of the charger-discharger 4A of the second embodiment mentioned above are achieved.

The embodiments of the present disclosure are described, based on the examples. However, the present disclosure is not necessarily limited to these examples. That is, it should be noted that various changes and modifications will become apparent to those skilled in the art, and such changes, modifications, and summarized scheme are to be understood as being within the scope of the present disclosure as defined by appended claims.

In the above-mentioned embodiments, the configuration is described as having the high level device 23 in the in-house power system 24, for the charger 4, the charger-discharger 4A, and the discharger 4B to set the supply power amount by performing the second control, in a non-communicable situation, i.e., when the charger 4, the charger-discharger 4A, or the discharger 4B is non-communicable with the high level device 23.

However, the present disclosure is applicable to other configuration in which no high level device 23 is provided in the in-house power system 24. That is, for example, when the determiner 422 determines whether the high level device 23 exists or not, and, the determination result of the determiner 422 indicates that the high level device 23 is not included in the in-house power system 24 from the beginning (i.e., the in-house power system 24 is organized as not including the high level device 23), the power amount controller 421, 421A, 421B may select and perform the second control.

What is claimed is:

1. A power supply controller connected with a power storage device disposed in a vehicle and with an outside-of-vehicle power system disposed outside of the vehicle, the outside-of-vehicle power system having a breaker that (a) supplies electric power from a commercial power system to an internal load of the outside-of-vehicle power system and (b) interrupts a power supply from the commercial power system to the internal load when the system is in operation, the power supply controller performing a charge control that charges the power storage device disposed in the vehicle with electric power supplied from the outside-of-vehicle power system, the power supply controller comprising:
a power amount controller controlling a supply power amount of the charge control; and
a determiner determining whether a management device is available to control a power supply to the internal load of the outside-of-vehicle power system; and
a charge control memory unit;
wherein
the power amount controller performs a first control that determines the supply power amount according to an instruction value received from the management device when the determiner determines that the management device is available, the charge control memory unit storing the instruction value received from the management device, and
the power amount controller performs a second control that determines the supply power amount according to information about a past power supply from the outside-of-vehicle power system when the determiner determines that the management device is unavailable by controlling the supply power amount of the charge control so that an actual power value supplied to the outside-of-vehicle power system does not exceed the instruction value previously stored in the charge control memory.

2. The power supply controller of claim 1, wherein
the outside-of-vehicle power system has the management device,
the determiner determines whether communication with the management device is enabled or disabled, and
the power amount controller performs the first control when the determiner determines that communication with the management device is enabled, and performs the second control when the determiner determines that communication with the management device is disabled.

3. The power supply controller of claim 1 wherein:
the charge control memory unit stores a power restriction value of the outside-of-vehicle power system, and
the power amount controller performs the second control by controlling the supply power amount of the charge control so that the actual power value supplied to the outside-of-vehicle power system does not exceed the power restriction value stored in the charge control memory unit.

4. The power supply controller of claim 1 wherein:
the charge control memory unit stores a past value of the actual power value previously supplied to the outside-of-vehicle power system, and
the power amount controller performs the second control by controlling the supply power amount of the charge control so that the actual power value supplied to the outside-of-vehicle power system does not exceed the past value stored in the charge control memory unit.

5. The power supply controller of claim 4, wherein:
the charge control memory unit stores information about an allowable time period in association with the past value, and
the power amount controller performs the second control by controlling the supply power amount of the charge control so that an excess time period of when the actual power value supplied to the outside-of-vehicle power system exceeds the past value stored in the charge control memory unit is equal to or shorter than the allowable time period.

6. The power supply controller of claim 1, wherein
the power supply controller additionally performs a discharge control that discharges electric power supplied from the power storage device to the outside-of-vehicle power system,
and
the power amount controller controls a discharge supply power amount of the discharge control.

7. The power supply controller of claim 6 further comprising:
a discharge control memory unit that stores a power restriction value of the outside-of-vehicle power system, wherein
the power amount controller controls the discharge supply power amount of the discharge control so that the actual power value supplied to the outside-of-vehicle power system does not exceed the power restriction value stored in the discharge control memory unit.

8. The power supply controller of claim 6 further comprising:
a discharge control memory unit that stores a past value that is an actual power value previously supplied to the outside-of-vehicle power system, wherein
the power amount controller controls the discharge supply power amount of the discharge control so that the actual power value supplied to the outside-of-vehicle power system does not exceed the past value stored in the discharge control memory unit.

9. The power supply controller of claim 8, wherein
the discharge control memory unit stores information about an allowable time period in association with the memory value,
the power amount controller controls the discharge supply power amount of the discharge control so that an excess time period of when the actual power value supplied to the outside-of-vehicle power system exceeds the past value stored in the discharge control memory unit is equal to or shorter than the allowable time period.

10. The power supply controller of claim 2, wherein
the determiner determines that communication with the management device is disabled when no communication is received from the management device for a preset time.

11. The power supply controller of claim 2, wherein communication with the management device is performed via a dedicated line.

12. The power supply controller of claim 1, wherein the charge control is performed by the power supply controller selectively during a time period when a price of electric power is less than a predetermined price.

13. The power supply controller of claim 1 further comprising:
a notifier notifying a user that the management device is not available when the determiner determines that the management device is not available.

14. A power supply system, comprising:
a power storage device disposed in a vehicle;
an outside-of-vehicle power system disposed outside of the vehicle and having a breaker that (a) supplies electric power from a commercial power system to an internal load of the outside-of-vehicle power system and (b) interrupts a power supply from the commercial power system to the internal load when the outside-of-vehicle system is in operation; and
a power supply controller connected with the power storage device and with the outside-of-vehicle power system and configured to perform a charge control that charges the power storage device disposed in the vehicle with electric power supplied from the outside-of-vehicle power system, the power supply controller configured to include:
a power amount controller controlling a supply power amount of the charge control; and
a determiner determining whether a management device is available to control a power supply to the internal load of the outside-of-vehicle power system; and
a charge control memory unit;
wherein
the power amount controller performs a first control that determines the supply power amount according to an instruction value received from the management device when the determiner determines that the management device is available, the charge control memory unit storing the instruction value received from the management device, and
the power amount controller performs a second control that determines the supply power amount according to information about a past power supply from the outside-of-vehicle power system when the determiner determines that the management device is unavailable by controlling the supply power amount of the charge control so that an actual power value supplied to the outside-of-vehicle power system does not exceed the instruction value previously stored in the charge control memory.

15. A power supply controller connected with a power storage device disposed in a vehicle and with an outside-of-vehicle power system disposed outside of the vehicle, the outside-of-vehicle power system having a breaker that (a) supplies electric power from a commercial power system to an internal load of the outside-of-vehicle power system and (b) interrupts a power supply from the commercial power system to the internal load when the system is in operation, the power supply controller for performing a charge control that charges the power storage device disposed in the vehicle with electric power supplied from the outside-of-vehicle power system, the power supply controller comprising:
a power amount controller controlling a supply power amount of the charge control; and
a determiner determining whether a management device is available to control a power supply to the internal load of the outside-of-vehicle power system; and
a charge control memory unit that stores a power restriction value of the outside-of-vehicle power system;
wherein
the power amount controller performs a first control that determines the supply power amount according to an instruction value received from the management device when the determiner determines that the management device is available, and
the power amount controller performs a second control that determines the supply power amount according to information about a past power supply from the outside-of-vehicle power system when the determiner determines that the management device is unavailable by controlling the supply power amount of the charge control so that an actual power value supplied to the outside-of-vehicle power system does not exceed the power restriction value stored in the charge control memory.

* * * * *